(12) United States Patent
Darden et al.

(10) Patent No.: US 6,185,722 B1
(45) Date of Patent: Feb. 6, 2001

(54) THREE DIMENSIONAL TRACK-BASED PARASITIC EXTRACTION

(75) Inventors: Laura Rohwedder Darden, Essex; James John Engel, Cambridge; Peter Anton Habitz, Hinesburg; William John Livingstone, Cambridge, all of VT (US); Daniel Joseph Mainiero, Austin, TX (US); Jeannie Harrigan Panner, Underhill, VT (US); Michael Timothy Trick, Essex, VT (US); Paul Steven Zuchowski, Cambridge, VT (US)

(73) Assignee: International Business Machines Corporation, Armonk, NY (US)

( * ) Notice: Under 35 U.S.C. 154(b), the term of this patent shall be extended for 0 days.

(21) Appl. No.: 09/037,469

(22) Filed: Mar. 10, 1998

Related U.S. Application Data

(60) Provisional application No. 60/040,829, filed on Mar. 20, 1997.

(51) Int. Cl.[7] ................................................ G06F 17/50
(52) U.S. Cl. ................................................................ 716/5
(58) Field of Search .................................. 364/488, 489, 364/490, 491; 395/500.01, 500.03, 500.05, 500.07, 500.35, 500.36, 500.37; 716/1, 2, 4, 5, 11, 12, 13, 14

(56) References Cited

U.S. PATENT DOCUMENTS

| | | | |
|---|---|---|---|
| 4,412,240 | * | 10/1983 | Kikuchi et al. .......................... 357/45 |
| 5,461,579 | * | 10/1995 | Misheloff et al. ............... 395/500.06 |
| 5,510,999 | * | 4/1996 | Lee et al. .............................. 364/491 |

(List continued on next page.)

OTHER PUBLICATIONS

Belkhale and Banerjee "Parallel Algorithms for VLSI Circuit Extraction," IEEE Transactions on Computer–Aided Design, vol. 10, No. 5, May, 1991, p. 604–618.*

Schaper et al. "Modeling and Experimental Verification of the Interconnected Mesh Power System (IMPS) MCM Topology," IEEE Transactions on Components, Packaging, and Manufacturing Technology—Part B, vol. 20, No. 1, Feb., 1997, p. 42–49.*

Wehn and Glesner "A New Approach to Timing Driven Partitioning of Combinational Logic," IEEE, 1991, p. 106–111.*

(List continued on next page.)

*Primary Examiner*—Paul R. Lintz
*Assistant Examiner*—Leigh Marie Garbowski
(74) *Attorney, Agent, or Firm*—Richard M. Kotulak

(57) ABSTRACT

A computerized tool or method that calculates the capacitance and resistance of each global wire on the chip, one wire at a time. The invention steps along a track containing a wire segment, grid point by grid point, calculating the resistance and capacitance at that point. At each grid point it searches the neighboring tracks within the surrounding cube for adjacent elements that could cause capacitive effects or affect the resistance of the wire. The method delivers capacitance and resistance values for each process condition for a grid unit length of wire, given the wire type and 3 dimensional environment of the wire segment. The capacitance and resistance at a grid point along the wire are generally determined by one table lookup for wire types based on the surrounding environment. These values are added along wire segments to deliver accurate 3 dimensional capacitances and resistances. The invention can also provide for wires and spaces of various types and widths not provided for in the tables and for calculation of net to net coupling capacitances.

28 Claims, 12 Drawing Sheets

U.S. PATENT DOCUMENTS

| | | | |
|---|---|---|---|
| 5,706,206 | * | 1/1998 | Hammler et al. .................. 364/489 |
| 5,761,080 | * | 6/1998 | DeCamp et al. ............... 395/500.06 |
| 5,828,580 | * | 10/1998 | Ho .................................... 364/489 |
| 5,838,582 | * | 11/1998 | Mehrotra et al. ............. 395/500.06 |
| 5,896,300 | * | 4/1999 | Raghavan et al. ................ 364/491 |
| 5,901,063 | * | 5/1999 | Chang et al. .................. 395/500.06 |
| 5,923,568 | * | 7/1999 | Oh et al. ........................... 364/490 |
| 5,999,726 | * | 12/1999 | Ho ........................................ 716/5 |

OTHER PUBLICATIONS

Lin and Kompa "FET Model Parameter Extraction Based on Optimization with Multiplane Data–Fitting and Bidirectional Search—A New Concept," IEEE Transactions on Microwave Theory and Techniques, vol. 42, No. 7, Jul., 1994, p. 1114–1121.*

* cited by examiner

THREE DIMENSIONAL TRACK-BASED PARASITIC EXTRACTION

CROSS REFERENCE TO RELATED APPLICATION

This application claims the benefit of U.S. Provisional Application No. 60/040,829 filed Mar. 20, 1997.

BACKGROUND OF THE INVENTION

In deep sub-micron designs, the effect of wire capacitance on system performance is as important as, if not more so than, the gate delay. To accurately predict system performance, accurate extraction of resistance and capacitance parasitics is required. The capacitance of a wire is dependent not only on its length, width, and thickness, but also on the environment around the wire. The environment includes any adjacent or near wires and the substrate itself. As wire pitches become smaller, the effects on capacitance of adjacent lines can be as much as two times as compared to an isolated wire. It is therefore very important to take into account the environment of a wire when predicting its capacitance.

Historically, most chip-level capacitance extractors have used one of two methods to derive wire capacitance:

1) High level analysis based on gross assumptions about the amount of capacitance per length of wire. This method relies on an educated guess as to the amount of adjacent wire that might be present. This is sufficient when the environment of a conductor does not change significantly or when the capacitance of the interconnects is only a small contributor to the overall output load.

2) Detailed shapes based analysis of the design environment surrounding the wire under consideration. This method is very computer intensive. Accurate total capacitance extraction of large chips is presently not feasible with this approach due to data volume and computer execution time.

Previous solutions in the second category are design shape based. They have to calculate and store a large number of geometric interacting shapes, creating a large computational burden and an immense amount of output. An example is Avant!'s LPE extraction. The Avant! extractor uses design shapes to calculate the capacitances based on overlap areas distances and perimeters. This requires a large amount of data to be stored and processed.

Another solution in the second category, pattern recognition, can also take advantage of the regular structure of global wires. But the recognition mechanism on design shapes is not as efficient and the intermediate storage requirements are much more severe. The tables are huge; the search and the generation is very time consuming. Pattern recognition solutions are accurate but cannot handle wire extraction for a complete chip. ARCADIA from EPIC takes this approach.

Now, with narrowly spaced five and six levels of metal, the overall wire capacitance is larger and varies by a factor of two depending upon neighboring wires. Effects of neighboring conductors have become the dominant contribution to the load in many critical nets and the hold time needed on many paths. Resolution of adjacencies becomes a critical part of accurate chip timing.

Therefore, method 1 is not a viable solution for these deep sub-micron technology designs because it doesn't take neighboring wires into account. Method 2 is not practical for large designs due to the data volume and computer execution time.

SUMMARY OF THE INVENTION

The invention takes advantage of the repetitive structure of the wiring and therefore does not need to calculate all these shapes present in a design. It also adds the capacitances along a net while they are generated, and so it does not need to store all this data, thus creating a huge advantage in efficiency.

This invention reduces the complexity of conductor environment, takes full advantage of the repetitive structure of automatic wiring, produces accurate results within ten percent of a full three dimensional finite element analysis and within ten percent as measured in hardware. It obtains, with its unique data structures and approximations, large improvements in runtime and data volume capacity over existing tools.

One object of this invention is to determine which wiring patterns are significant through a detailed analysis of the various topologies and to generate entirely inclusive, capacitance data tables based on this knowledge.

Another object of this invention is to provide an extraction tool which applies a searching technique to discover the environment around a section of wire and then does only one memory reference to obtain the entire capacitance for a one unit length section of the wire.

It is a further objective of this invention to provide a tool which models its environment based on a three dimensional yes/no boolean grid to accomplish full chip capacitance extraction without limiting the flexibility of handling any wire width as long as the wire spine is on the grid.

Yet another objective of this invention is a capacitance extraction tool that establishes a priority to the searches allowing the tool to stop searching when the first neighbors are encountered.

Yet another objective is to provide a capacitance extraction tool which partitions the capacitance data to ensure additivity of capacitance of one unit length wire pieces and avoid double counting of three dimensional effects.

Yet another objective is to provide resistance data tables based on the environment and a resistance extraction tool with the same capabilities as the capacitance extraction tool, but with respect to resistance.

Yet another objective of this invention is to produce RC data output from the extraction process, eliminating the need for elaborate post-processing steps.

A final objective of this invention is to calculate net to net coupling capacitance for use in various tools such as static timing analysis tools, simulation tools, and noise analysis tools.

PREFERRED EMBODIMENT OF THIS INVENTION

Overview

Figure 1:
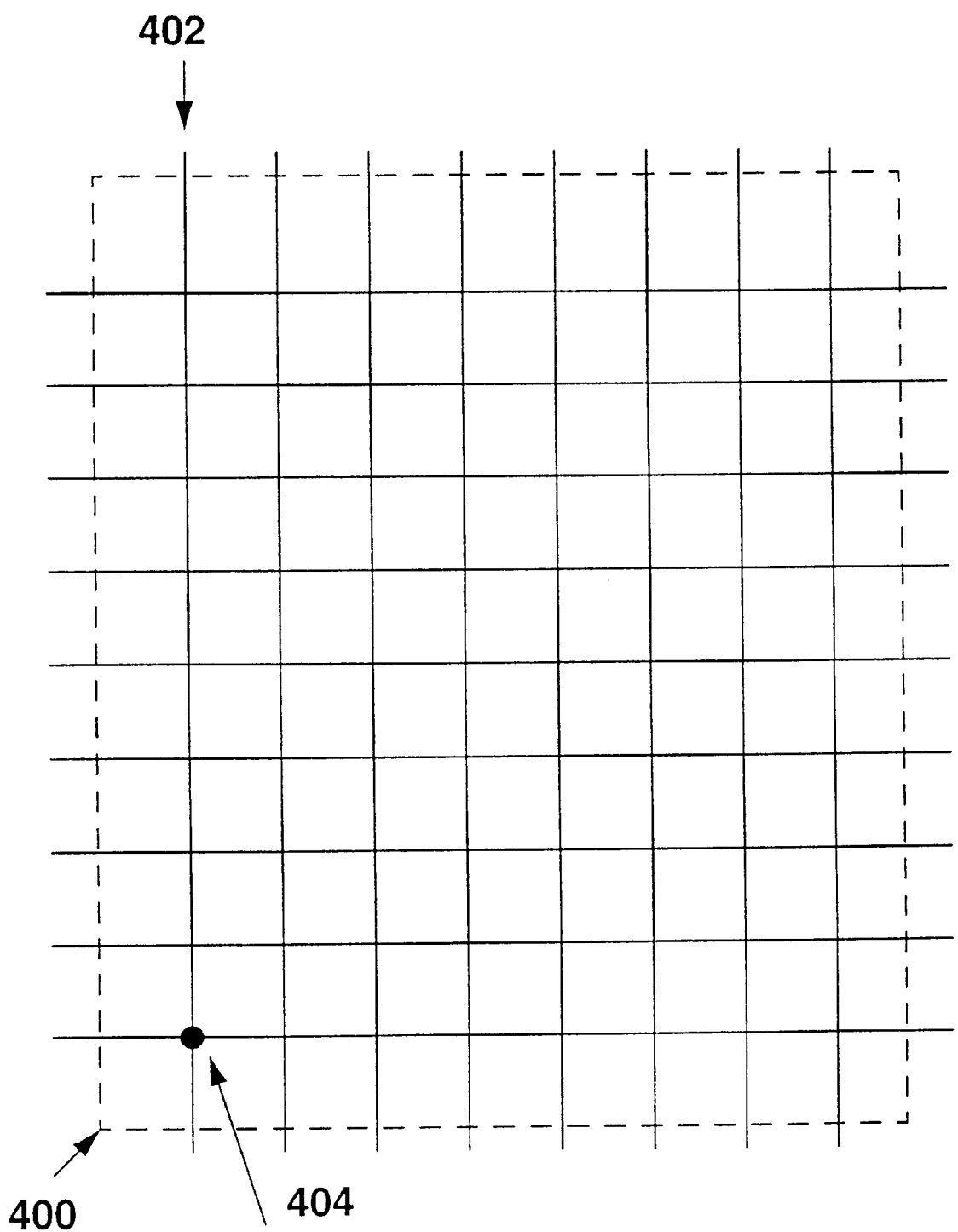
FIG. 1 shows a gridded wiring system.

The invention uses a 3D grid-based model to represent the Application Specific Integrated Circuit (ASIC) or any other type of integrated circuit which has complex wiring patterns. The ASIC is described as design wires connecting circuit abstracts, rather than the mask level design data. The design space (400 in FIG. 1) is divided into horizontal and vertical wiring tracks on each wiring plane. Wire 402 in FIG. 1 represents a single vertical track. The spacing between tracks is defined by the distance required for a minimum width line and a minimum width space. A grid point is defined as the intersection of a horizontal and a vertical wiring track (404 in FIG. 1). A gridded wiring system is a system that only allows wires to change direction or wiring plane at a grid point. The invention is based on the knowledge that the environment of a wire can change only at a grid point in a gridded wiring system. A grid unit is the distance between two adjacent vertical or horizontal grid points. The environment of a wire is defined as the set of other wires that are "close" to the wire of interest. Using the assumption of a gridded system allows simplification of the calculations involved in determining a wire's environment. In addition, it is necessary to recalculate a wire's environment only once per grid point. Although the grid system is defined in terms of the smallest width and space that can be used on a given wiring plane, the system can be defined to support wider wires with varying spaces using the same grid definitions. The "spine" of a wire is defined as a stick figure representation of a wire which lies upon a track in the x or y direction. The spine of a wire is usually the center line of the wire.

Figure 2:
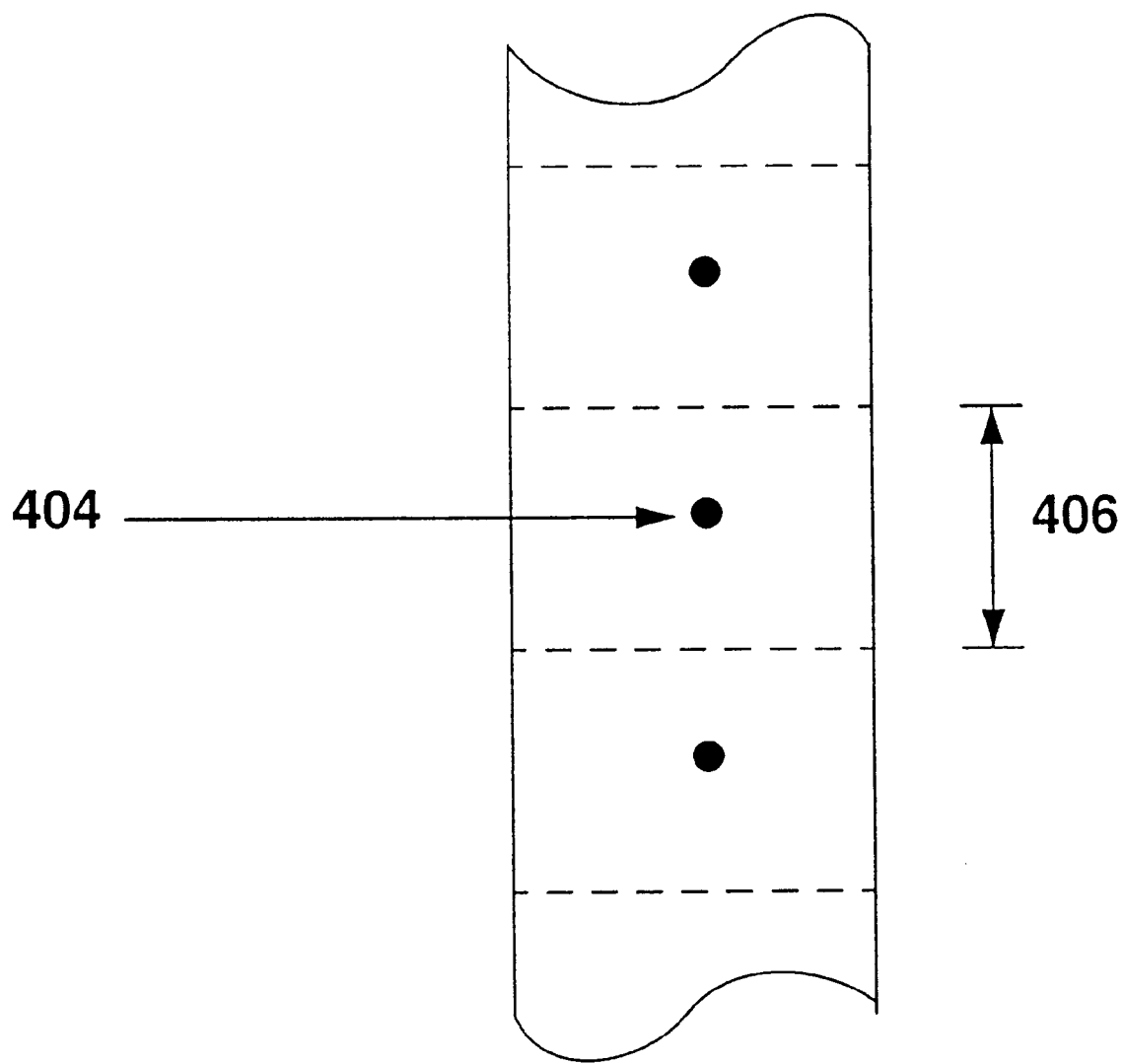
FIG. 2 shows capacitance calculation one grid point at a time, walking down a wire.

This invention is a tool that calculates the capacitance of each global wire on the chip, one wire at a time. The invention steps along the wire, grid point by grid point (FIG. 2), summing the capacitance as it goes. At each grid point 404 associated with a grid unit (the distance between tracks) 406, it searches the neighboring tracks within the surrounding cube for adjacent elements that could cause capacitive effects. The method delivers capacitance and resistance values for each process condition for a grid unit of wire, given the wire type and 3 dimensional environment of the wire segment. The capacitance and resistance at a grid point along the wire are generally determined by one table lookup each, based on the surrounding environment. These values are added along wire segments to deliver accurate 3 dimensional capacitances and resistances.

In the implementation for IBM CMOS5 and CMOS6 technologies, the tool performs an ordered search consisting of the 3 unique search patterns, ordered according to the distance of neighboring wires from the grid point under evaluation. The tool performs Search 1 first and stops if it finds any of the Search 1 configurations. If it doesn't, it goes on to Search 2, and stops if it finds any Search 2 configuration. If it doesn't, it goes on to Search 3 and stops if it finds any Search 3 configuration. A background value is provided if no wires are found. The ordered search allows quick calculation of capacitances for dense parts where searches are successful in Search 1. When a neighboring wire is found, the value of capacitance assigned to that particular one-track section of wire is calculated assuming the entire set of wires in the next search is populated. Because "nearest-neighbor" wires capture most of the capacitance field lines, the error involved in making this assumption is minimal.

Figure 3:
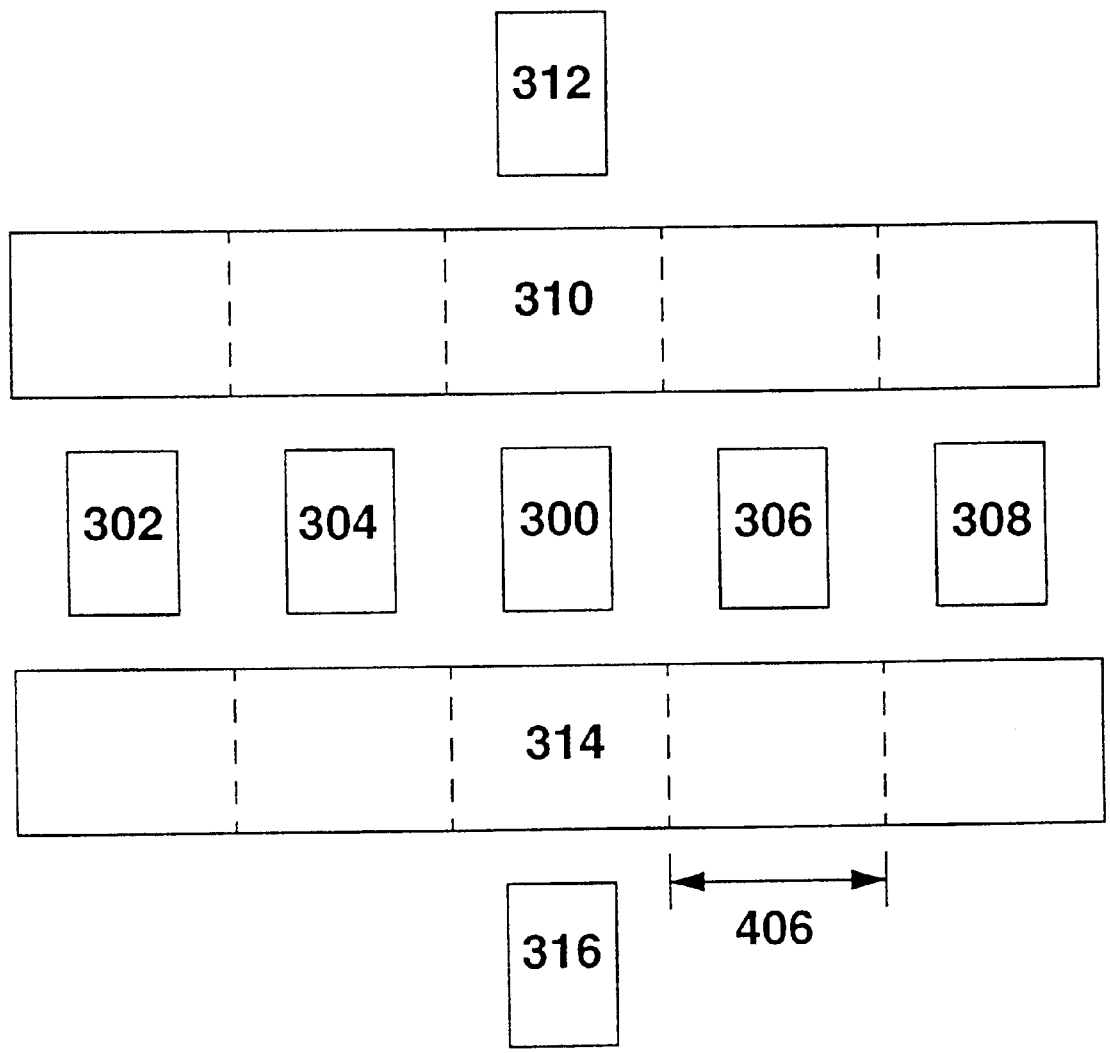
FIG. 3 shows the environments inspected in Search 1 and Search 3.
Figure 4:
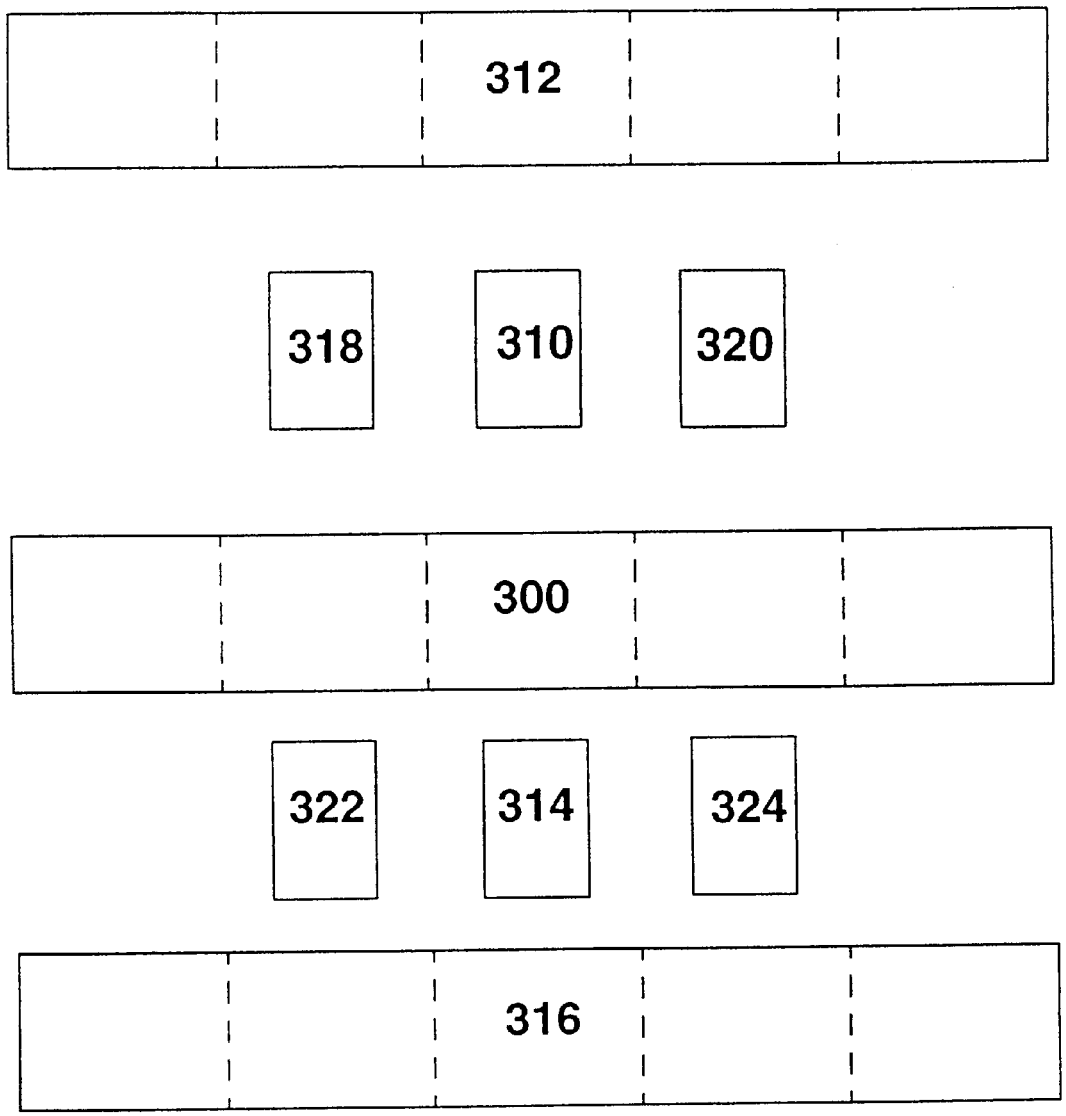
FIG. 4 shows the environment inspected in Search 2.

The invention requires that the silicon technology be pre-analyzed using conventional 2-D and 3-D field solvers. The results of this analysis are then converted to a small set of tables which are used by the chip-level global extraction tool. In the current implementation, the possible environments for a wire are broken into three buckets called searches. Each search consists of a set of environments related by their relative impacts on the capacitance of the line under evaluation. Search 1 contains those environments which result in the largest impact on capacitance of the wire under analysis (FIG. 3, points 304, 306, 310 and 314). Search 2 contains those environments which result in lower impact on the capacitance of the wire under analysis (FIG. 4, points 318, 320, 322, and 324). Search 3 contains those environments with the lowest impact on capacitance (FIG. 3, points 302, 308, 312, 316). Table values for all 3 searches are provided for best case, nominal, and worst case process conditions. The number and order of searches may vary by silicon process technology.

Assumptions and Approximations

The following assumptions and approximations were made in the implementation of the invention described herein:

The metal shapes making up the circuits of each ASIC library element are abstracted into grid-based representations. These circuit abstractions closely represent the actual metal shapes. These wiring obstruction or "blockage" shapes are treated as if they were wires. If these blockage shapes are too conservative, the calculated capacitance will be high. It is assumed that the blockage shapes can be made as accurate as needed.

It is assumed that other wires in the environment are spaced like the highest density wires: The wire width of a neighboring wire is ignored. Most wires use minimum space.

The environment of a wire can change only at each grid point. In a gridded system, this assumption is valid except when a global wire is near an off-grid wire from a circuit. The error introduced by this assumption is minimal.

Wires run with the preferred direction of metal on each plane—either north-south or east-west. Alternate wiring planes run in orthogonal directions. Crossing lines cannot accumulate large capacitances. This assumption allows a search to be done without having to store detailed information about adjacent wires. This assumption is true most of the time.

The capacitance of a wire can be broken down into a sum of capacitances originating from wire pieces one grid unit long. The capacitance tables represent the total capacitance for the defined environment of a one grid unit wire segment.

Searches are ordered. When a wire has close neighbors, the variations in the environment further away do not change the capacitance anymore. (When a configuration in a particular search is found, the value of capacitance assigned to the particular grid-unit section of wire is calculated assuming that the entire set of wires in the next search is populated.)

Wires are infinitely long. Global wires are so long that the specific change of the capacitance at the end of a wire does not count in the total. This assumption allows minimization of the number of table entries by neglecting "end-of-line" effects. The error introduced with this assumption can be minimized by setting the capacitance value of a via to statistically offset the effects of line ends.

Wires are modeled as bars. This allows simplification of the creation of the data tables. A 3-D field solver would be required for all cases if this assumption were not made.

Vias don't contribute to capacitance. Statistically they do not need to be considered relative to the bulk of the wire segment.

A metal layer with all tracks occupied behaves like a parallel plate capacitor. This approximation is very good and is needed to calibrate the tables and ensure consistency with other extraction methods. In deep sub-micron technology, the fringe effect makes each wire effectively larger; this effect makes the assumption reasonable.

Silicon (the layers below the bottom-most metal layer) behaves like a single conductor plane: the program ignores transistors and junctions. Due to the relatively small variation in thickness on this level, the whole device area can be approximated with one metal plate.

The dielectrics separating the various wiring planes are isotropic (defects or other changes to the dielectric that are position-dependent are ignored.) The error introduced by this assumption is minimal, and can't be predicted ahead of time.

As a wire gets wider, the perimeter and line-to-line components of the total capacitance of that wire do not change. Only the area term of the capacitance changes. This allows adjustment of the table to any wire width and is a close approximation.

The capacitance reduces as 1/d where d is the distance between adjacent lines on the same wiring level. This allows adjustment to any wire spacing. This assumption uses the fact that the parallel plate capacitance is a function of 1/d. In deep-submicron technology, at small spaces, two adjacent lines "look like" parallel plates.

Net to net coupling capacitance can be assumed to be from wires on the same plane only, due to orthogonality of alternating planes.

Technology Data Generation

Knowledge of the technology under analysis allows one to develop a simplified search technique which eliminates some configurations from consideration. For example, for IBM's CMOS5 and CMOS6 technologies, the algorithm considers neighbors in the following categories:

Category 1—One track left and right of the wire's lengthwise edge and one track above or below the wire's spine.

Category 2—One track diagonally up and forward, one track diagonally up and backward, one track diagonally down and forward and one track diagonally down and backward along the wire's spine.

Category 3—Two tracks left and right of the wire's lengthwise edge and two tracks above or below the wire's spine.

An exhaustive approach of examining these neighboring grid points would require 4096 ($2^{12}$) table values for a given grid point. Category 1, 2 and 3 each require $2^4$ combinations, collectively yielding $2^{12}$ combinations. The approach of this invention condenses these cases into a manageable member of table values for a given grid point. For IBM CMOS5 and CMOS6 technologies, categories 1, 2, and 3 require 8, 6, and 9 table values, respectively. Each table value represents a set of topologies having similar capacitances. For example, a wire to the left (in an otherwise empty configuration) is equivalent to a wire to the right (in an otherwise empty configuration).

In the preferred embodiment for IBM CMOS5 and CMOS6, process technology table values are not summed to produce the total capacitance at a given grid point. For example, the table value representing one item left of the wire is not added to the table value representing one item above the wire to compute the table value representing both one item left and one item above the wire. Only one of the 23 table entries is selected as the capacitance contribution at a given grid point for a given process condition for a given wire type (width & space) and metal level.

The key to condense 4096 table entries to only 23 lies in the generation of the data. Rather than just limiting the search, an intelligent method was used to identify significant sets of topologies, calculate their capacitive effects and adjust the data to ensure that additivity along a wire will not accumulate error. The 23 topological configurations are listed below and are illustrated in FIGS. 3 and 4.

FIGS. 3 and 4 are 2 dimensional drawings representing the wiring layer environments inspected in Searches 1, 2, and 3. Wires 300, 302, 304, 306, 308, 312, and 316 run east-west. Wires 310, 314, 318, 320, 322, and 324 run north-south. Section 406 of the wire in FIG. 3 represents a grid unit. Search 1 involves only closest neighbors (304, 306, 310, and 314) to the one-track-long wire section or grid unit (300) under inspection. Search 2 involves only the diagonals 318, 322, 320, and 324 in FIG. 4. Search 3 involves only the environment 2 tracks and 2 layers away (2nd order environment), wires 302, 308, 312, and 316.

Search 1 contains 8 topological configurations:

1. FIG. 3 wires: 304 and 306 and 310 and 314 (this is worst case environment)
2. FIG. 3 wires: 304 and 306 and (310 or 314)
3. FIG. 3 wires: (304 or 306) and 310 and 314
4. FIG. 3 wires: 310 and 314
5. FIG. 3 wires: 304 and 306
6. FIG. 3 wires: (304 or 306) and (310 or 314)
7. FIG. 3 wires: 310 or 314
8. FIG. 3 wires: 304 or 306

If none of the configurations of Search 1 is met, Search 2 is invoked. Search 2 contains 6 topological configurations:

1. FIG. 4 wires: 318 and 320 and 322 and 324
2. FIG. 4 wires: (318 or 320) and 322 and 324
3. FIG. 4 wires: (318 and 322) or (320 and 324)
4. FIG. 4 wires: (318 and 324) or (320 and 322)
5. FIG. 4 wires: (318 and 320) or (322 and 324)
6. FIG. 4 wires: 318 or 320 or 322 or 324

If none of the configurations of Search 2 are met, Search 3 is invoked. Search 3 contains 9 topological configurations:

1. FIG. 3 wires: 302 and 308 and 312 and 316
2. FIG. 3 wires: 302 and 308 and (312 or 316)
3. FIG. 3 wires: (302 or 308) and 312 and 316
4. FIG. 3 wires: 312 and 316
5. FIG. 3 wires: 302 and 308
6. FIG. 3 wires: (302 or 308) and (312 or 316)
7. FIG. 3 wires: (312 or 316)
8. FIG. 3 wires: (302 or 308)
9. None of the wires in FIGS. 3 or 4 is present (best case environment).

Figure 5:
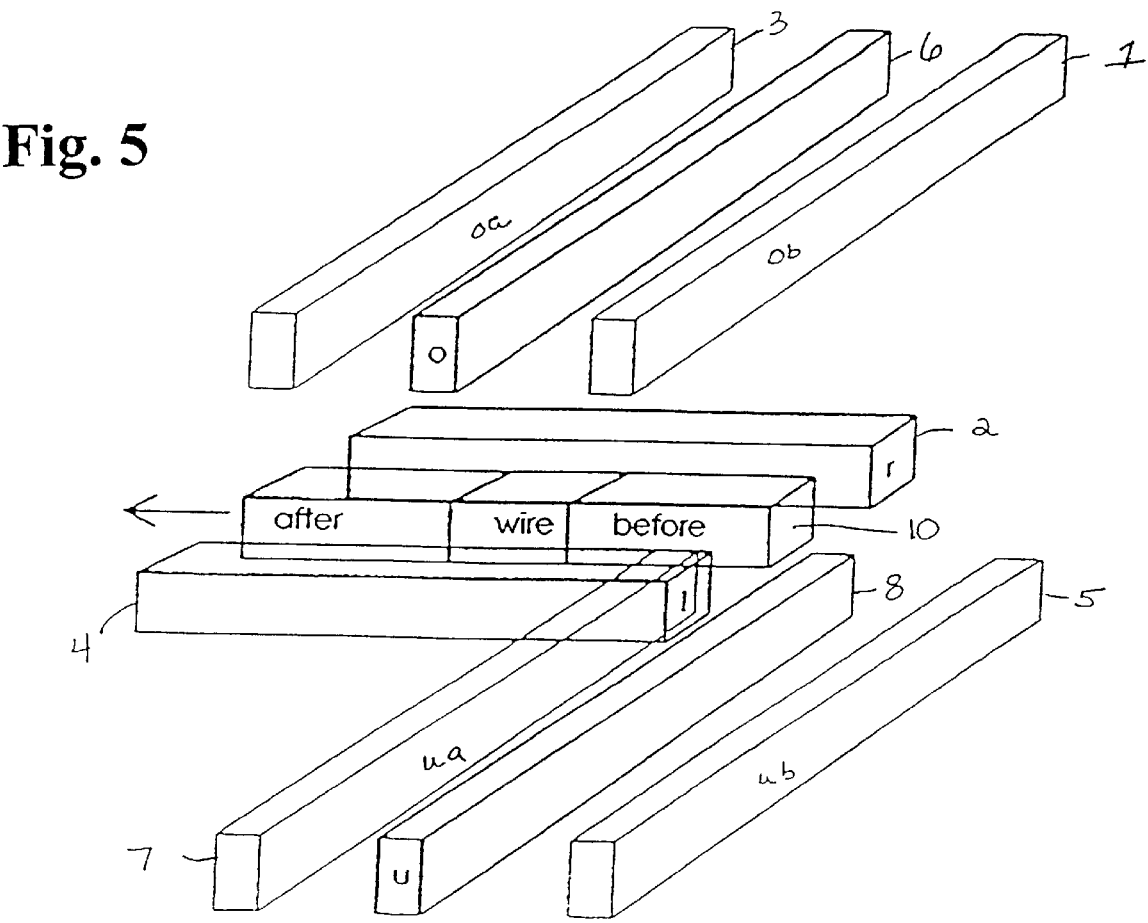
FIG. 5 and FIG. 6 are 3 dimensional pictures of the environments inspected in Searches 1, 2, and 3.
Figure 6:
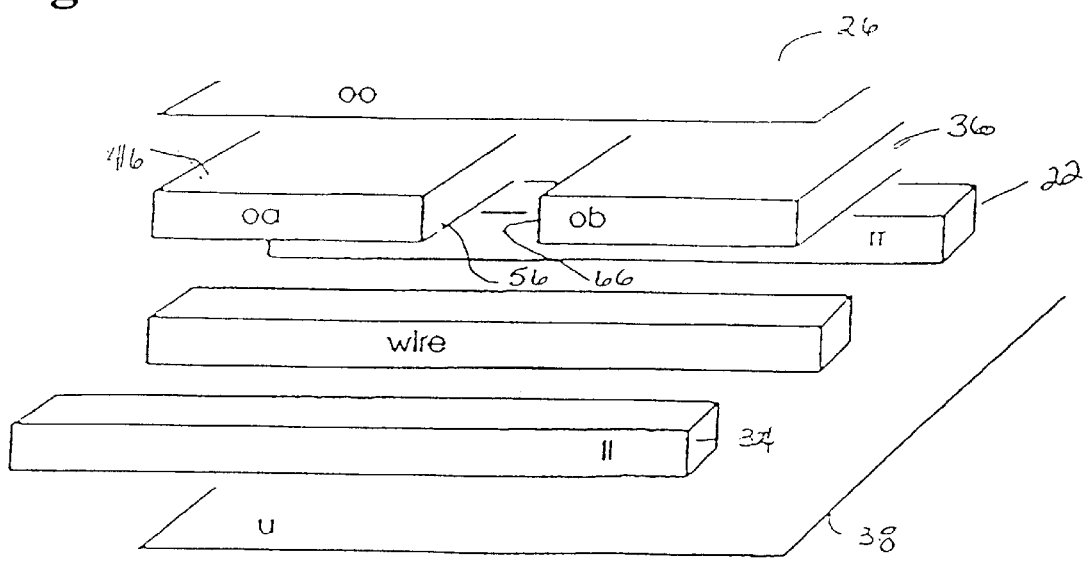

FIGS. 5 and 6 illustrate a three-dimensional view of the searches.

Search 1 looks from the piece of wire to the next track right and left and vertically up and down (See FIG. 5). The program assumes during this search, that there always is a conductor in the next further place. If nothing has been found to the right, (cases 3,4,6,7, in Table 1) the program assumes a wire two tracks off to the right, symbolized by rr in Table 1 and 22 in FIG. 6. If nothing is found directly over the wire piece, (cases 2,5,8, in Table 1) the program assumes a plate two levels above (symbolized by oo or 26 in FIG. 6), and wires 1 and 3 in FIG. 5 directly above the wire segment but before and after the one-track-piece under consideration. These are symbolized with over-after and over-before or as in Table 1 oa+ob. The situations to the left and underneath are treated in the same way. If no conductor is found in the direct environment the program goes to the next search. This first search consists of the following cases (or equivalent geometry). Any conductor found in the first sphere is represented with the first letter of the search direction.

TABLE 1

| # | right | left | above | beneath |
|---|-------|------|-------|---------|
| 1 | r | l | o | u |
| 2 | r | l | oo + oa + ob | u |
| 3 | rr | l | o | u |
| 4 | rr | ll | o | u |
| 5 | r | l | oo + oa + ob | uu + ua + ub |
| 6 | rr | l | o | uu + ua + ub |
| 7 | rr | ll | o | uu + ua + ub |
| 8 | r | ll | oo + oa + ob | uu + ua + ub |

Search 2 analyzes the environment with the wires in the diagonal over and under, one track before or after the wire piece under consideration in direction of the extraction. These wires are illustrated as 1, 3, 5, and 7 in FIG. 5. For all of these cases it is assumed, that there are wires two tracks off right and left and a plate two layers above or underneath. This is symbolized by rr in the first column of Table 2 and ll in the second column. If there is no wire found in the diagonals over and under the program will go to the third search. The following situations are analyzed in the second search:

TABLE 2

| # | right | left | above | beneath |
|---|-------|------|-------|---------|
| 1 | rr | ll | oo + oa + ob | uu + ua + ub |
| 2 | rr | ll | oo + oa | uu + ua + ub |
| 3 | rr | ll | oo + ob | uu + ub |
| 4 | rr | ll | oo + ob | uu + ua |
| 5 | rr | ll | oo + ob + oa | uu |
| 6 | rr | ll | oo + ob | uu |

Search 3 analyzes the situation two tracks right and left and 2 layers up and down. These cases are analogous to the first search. The environment 2 tracks right and left is analyzed assuming a wire three tracks away is always present. In up and down direction there is at least a three track large hole over and under the wire because the first and second search did not find anything. The next further layer over and under has wires running in parallel to the wire under consideration because of the orthogonal wire patterns. Finding conductors on this level means, that at least one of the three wires, vertically above and on the next track right and left, has been found. Otherwise a plate on the next layer now three layers away, symbolized with ooo, is assumed. If no conductor is found in this third search, the default, a plate three layers above and under and three tracks right and left, is used. The cases for the third search are:

TABLE 3

| # | right | left | above | beneath |
|---|-------|------|-------|---------|
| 1 | rr | ll | oo | uu |
| 2 | rr | ll | ooo | uu |
| 3 | rrr | ll | oo | uu |

TABLE 3-continued

| # | right | left | above | beneath |
|---|-------|------|-------|---------|
| 4 | rrr | lll | oo | uu |
| 5 | rr | ll | ooo | uuu |
| 6 | rrr | ll | oo | uuu |
| 7 | rrr | lll | oo | uuu |
| 8 | rr | lll | ooo | uuu |
| 9 | rrr | lll | ooo | uuu |

In this table the search direction abbreviations are doubled to symbolize that the conductors are 2 tracks or layers away and trebled for the default conditions. Case 9 is the background with conductors 3 layers and tracks away.

To generate the values for the tables one first establishes best case (BC) nominal (NOM), and worst case (WC) process conditions for the physical geometry of the metalization. The technology information for the metal thickness t, the dielectric thickness above, and beneath for every level of global wires is determined. For the most dense wire type used by the global wire connections on a given metal level the physical width (w), and space (dr) right, and (dl) left is determined. The analogous values are needed for all environments, 1,2, 3 layers over and under and 1,2,3 tracks distant right and left. The BC and WC geometries include process bias tracking and statistical mixing of independent geometry variations. It also includes the approximation of the floating metal fill shapes (inserted to meet manufacturing metal density requirements) by means of an effective dielectric thickness included in WC conditions. This only plays a role if no designed metal is directly above or underneath nor in the diagonal positions, (that means only for the WC conditions in the third search). Using the average device density a medium dielectric thickness to silicon is used. Similarly, for the top layers an effective distance to the package conductor is established.

The calculations are done in several stages:

1A) Calculate all capacitances for the first and third search conditions in BC,NOM,WC with a two dimensional field solver. An IBM tool C2D2, can be used. A similar tool is available from Technology Modeling Associates ("TMA") to perform this function.

2A) Calculate all capacitances for the second search condition. Run three dimensional calculations using C3D*, IBM's three dimensional tool, for the "shutter" type geometry to establish the three dimensional fringe of a wire before or behind the piece considered. (The fringe component of capacitance is converted to an equivalent area-based term.) The three dimensional solver called Rafael from TMA could also be used.

The capacitance from "wire" to the conductor environment u+ll+rr+ob+oa+oo is calculated for varying distance between the plates oa and ob as shown in FIG. 6 by sliding in and out 36 and 46 looking for edges 56 and 66. If this distance is very small the shutter is closed and the environment is the same as in the 2 dimensional situation u+ll+rr+o. If the opening is very large, the 2 dimensional environment u+ll+rr+oo is dominant. All medium values can be described as linear combination of the two 2 dimensional extremes. The coefficients determine the effective size of the opening. This method is used to determine how far the conductors for the second search over-before and over-after effectively encroach into the area over the one track long wire piece under consideration. The capacitance value for an opening equal to one missing wire is expressed by a linear combination of 2 dimensional capacitances from the first and third search, the case of a plate directly above and 2 layers above. The advantage of this method is to ensure additivity of the capacitance table values along a wire segment and consistency with the other table values together with a proper treatment of the three dimensional capacitance. A more detailed explanation with a 2 dimensional figure follows.

Figure 7:
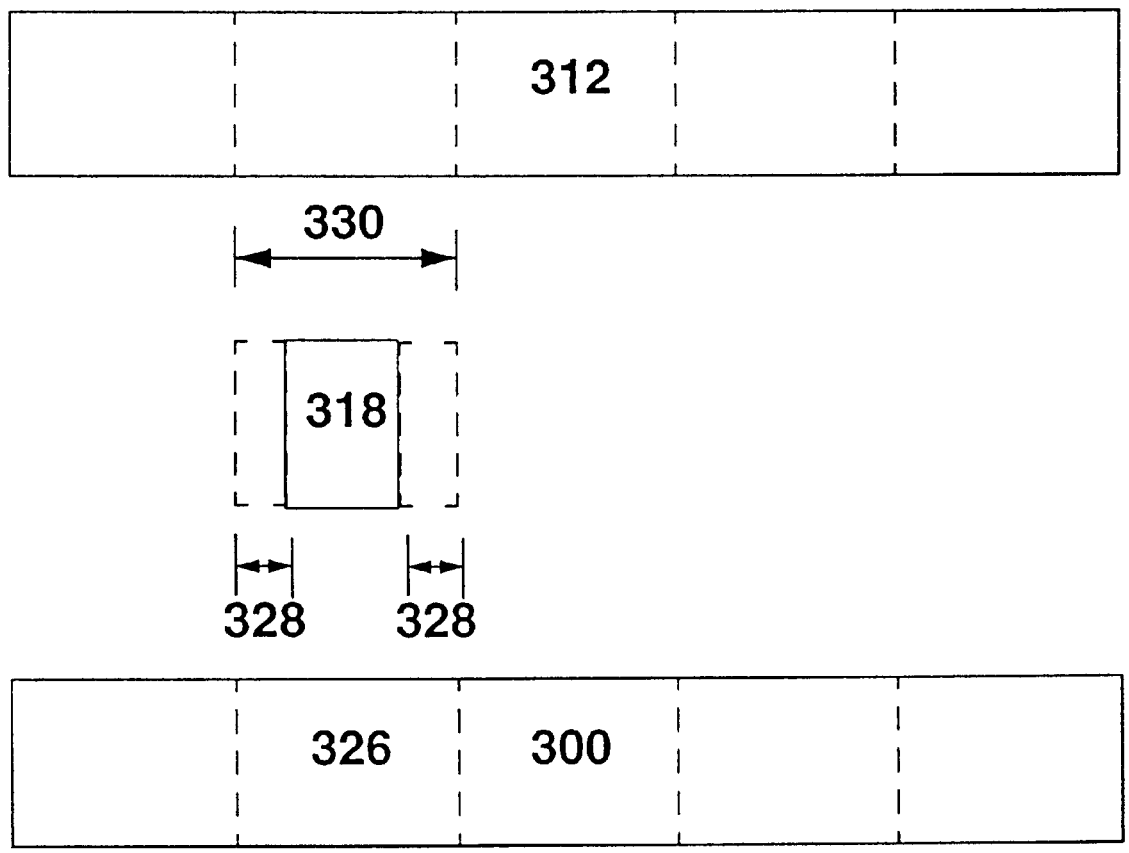
FIG. 7 shows how the capacitance tables for Search 2 are generated.

FIG. 7 is a 2 dimensional illustration of a wire segment (300) for which capacitance is being calculated and a wire one plane above and behind that wire segment grid. Wire 318 contributes capacitance to both the current segment 300 and the previous segment 326 (assuming the capacitance calculation is being done from left to right). Wire 318 also shields segments 300 and 326 from part of the capacitance due to wire 312. First the capacitance (both fringe and area) associated with wire 318 on segment 326 is calculated using a 3D field solver. Then wire 318 is artificially extended (328) and it is assumed that all of the capacitance from 318 to 326 is due to the area component of the capacitance. The length of 328 is calculated by making multiple runs of a 2D field solver for various lengths of 328 and picking the value that matches the capacitance measured with the 3D field solver. To calculate the table entries, all subsequent runs use the calculated wire extension (328). To calculate the table values for Search 2, a linear combination of area terms is used:

$$C\text{table} = (1-p)K1 + pK2$$

'K1' represents the area capacitance of a wire 1 plane directly above.
'K2' represents the area capacitance of a wire 2 planes above.
'p' is the percent of the wiring grid that is "out from under" the wire with the calculated extensions (330 in FIG. 7).
This equation is solved for the 6 possible combinations of wires in Search 2.

The equation used to compute the total capacitance for a wire type of width and space not in the tables specified in steps 1 and 2 above for a wire track segment is:

$$C\text{table} = C0 + (C1 \times \text{Delta\_}W) + (C2/\text{Delta\_}D)$$

C0 represents the capacitance of a minimum wire width at minimum spacing (value in base tables).
C1 represents the capacitance contribution due to the width variation and Delta_W is that width.
C2 represents the capacitance contribution due to the spacing variation and Delta_D is that spacing.

The following calculations are done to handle this type of wire:

1B) Create a set of table values for all geometries described above but without wires to the right and left. Assuming that the total capacitance changes are inversely proportional to the distance of wires, this table allows creation of tables for wire types which have a larger space to the edge of the track. This set of table values contains the values C2 for Search 1 (8 values), Search 2 (6 values) and Search 3 (9 values) for each process condition. These values represent the capacitance contribution for a wire with space which varies from the base set created in steps 1A and 2A above.

2B) Create a set of table values containing only the area component up and down. This table applies to the parallel plate approximation using the distance to the layers above and under for any wire with unit width. For the second search it also uses the linear combination of 2 dimensional capacitance values as described above. This table allows one to create capacitance values for any wire type with varying width assuming constant fringe and lateral line to line components. This set of table values contains the values C1 for Search 1 (8 values), Search 2 (6 values) and Search 3 (9 values) for each process condition. These values represent the capacitance contribution for a wire whose width varies from the base tables created in steps 1A and 2A above.

3B) Combine the values of step 1B, step 2B, and the values of the minimum wire type at highest density from Steps 1A & 2A into a single table with 3 coefficients for each table entry. For purposes of the chip-level extraction discussion, these 3 coefficients can be thought of as a single capacitance entry (and an on-the-fly execution of the equation).

Note that if there are no fixed wire types, all wires in a design can be handled by the table created in steps 1B, 2B, and 3B. Alternatively, these steps could be used to create the table described in step 1A and 2A The tables are collected into a complete set of capacitance table entries for every wire type, for best case, nominal, and worst case process conditions, for every metallization layer which is used in the extraction process. The table value calculation is done once per technology, and the data is entered into tables used by the extraction program itself.

Chip-Level Extraction

The software supporting the invention was developed as a function of IBM's graphical physical design editor ChipEdit. Other physical design extraction tools could be extended to use this method.

ChipEdit manages physical data utilizing several different data structure techniques. One such technique stores the data by organizing it into 2D buckets called grid cells. Each grid cell contains pointers to data items which intersect its area. These grid cells provide efficient data retrieval throughout ChipEdit for various graphical, editing and checking features of the tool.

ChipEdit uses these buckets to efficiently create its three dimensional grid developed for this invention. Furthermore, for large designs, ChipEdit's bucket approach to data storage makes it easy to process the design incrementally.

The three dimensional model is implemented using one byte of storage at every grid intersection. Although one bit is sufficient for the yes/no decision, the use of a byte allows the algorithm to encode as a mask the type of data present at a neighboring location (wire, blockage, power, pin (connection point), . . . ) which is needed for net to net coupling capacitance processing.

Figure 8:
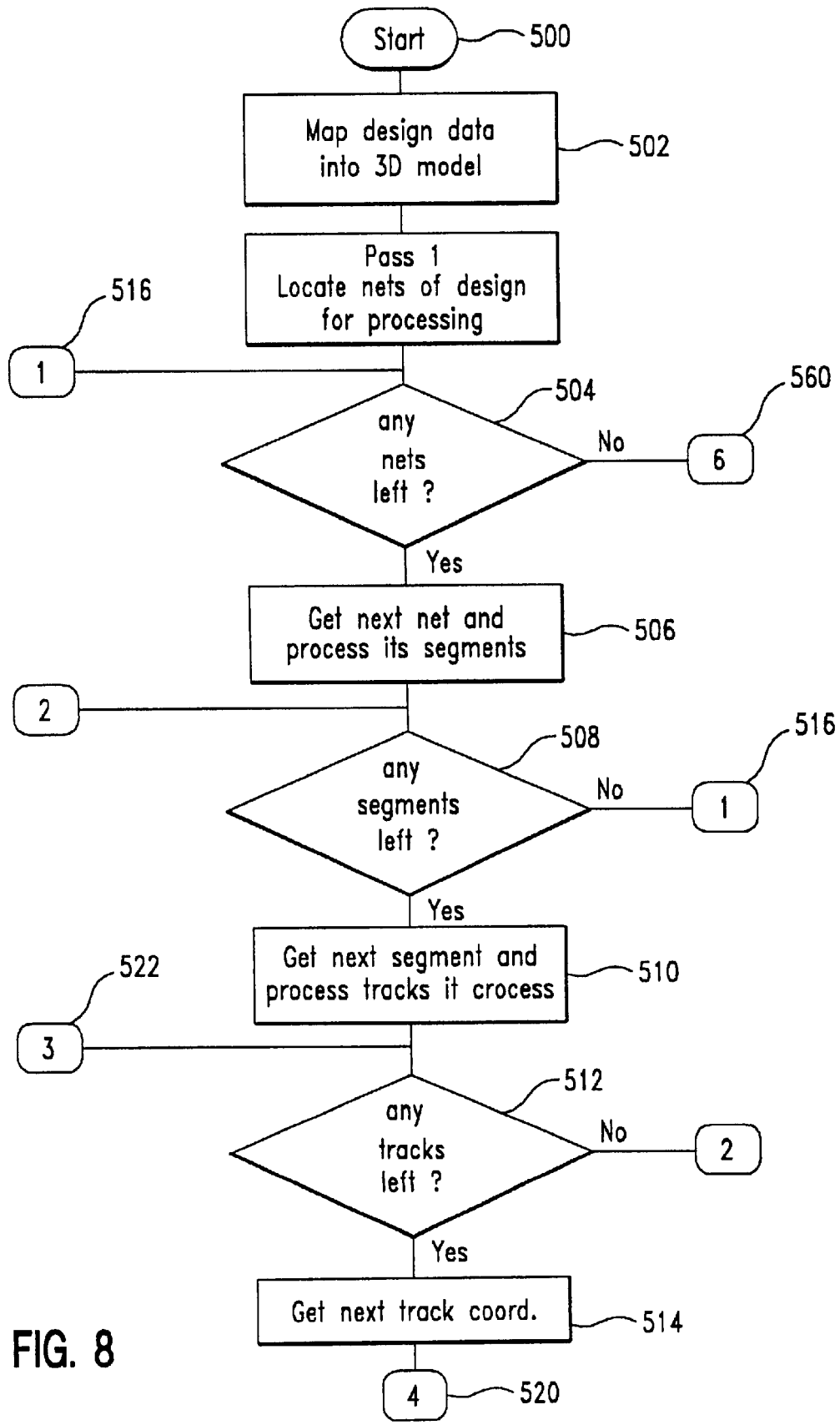
FIGS. 8, 9, and 10 are flow charts describing the chip-level extraction algorithm, ignoring net to net coupling.
Figure 9:
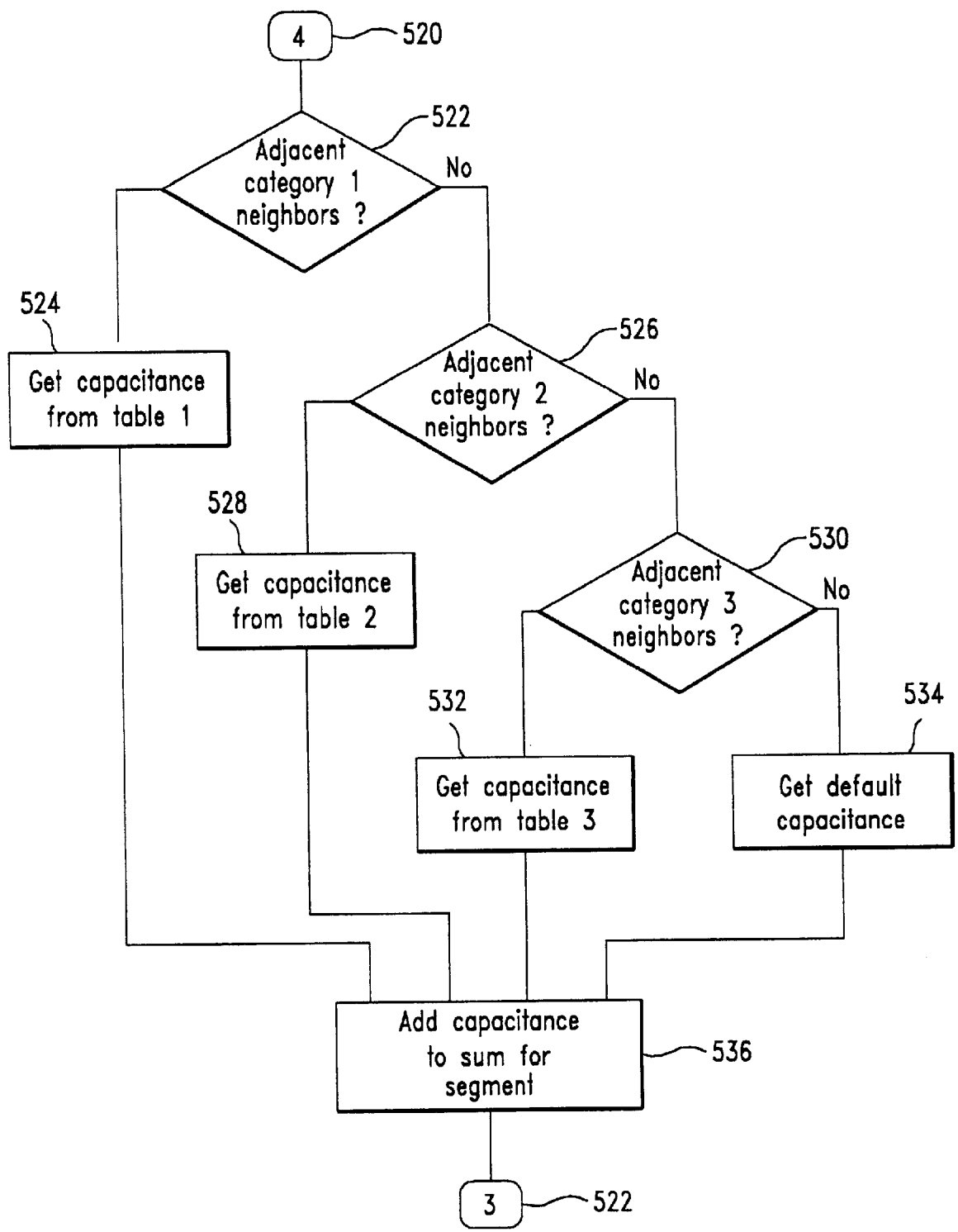
Figure 10:
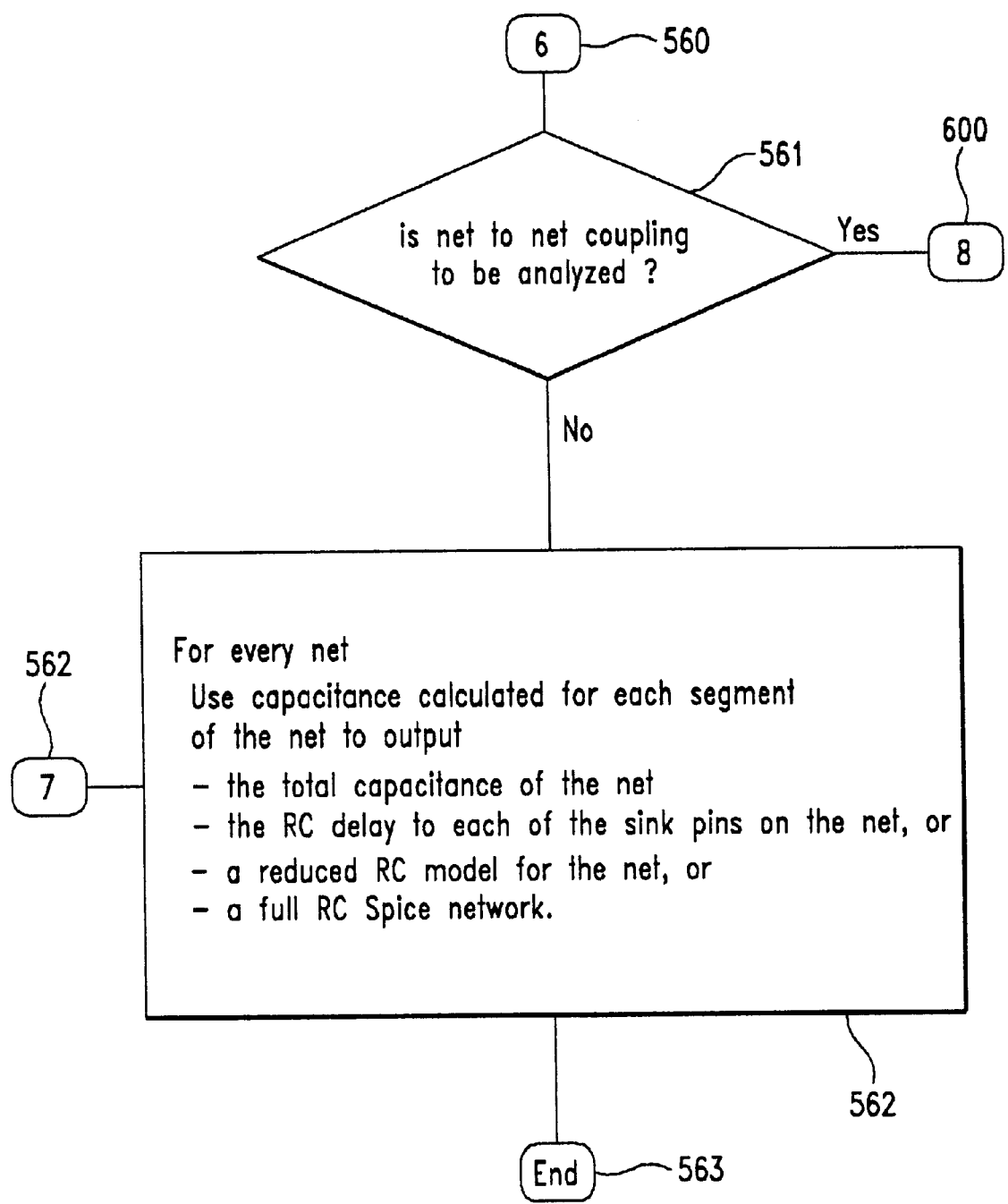

The steps of the invention illustrated in FIGS. 8 through 10 are as follows:

1. Referring to FIG. 8, the tool starts at 500 by mapping (at 502) the blockage, segments, power buses, logic pins and power pins of the design into the three dimensional model. The resulting model is a three dimensional grid with a yes/no decision value at each track intersection in the model. For large designs, the model is partitioned into smaller regions and processed incrementally.

2. The tool determines if there are any nets left to process in decision block 504, gets the next net in step 506 and proceeds to loop through each of its wire segments (decision block 508 and step 510) and each track intersection of each wire segment (decision block 512 and step 514). For each track intersection of each wire segment, the tool proceeds at 520 to FIG. 9. When each net is completed, the tool proceeds to step 516. When all nets in the design are processed, the tool proceeds to step 560.

3. At 520 on FIG. 9, the tool begins the environment search for a track intersection of a particular wire segment. At decision block 522, Search 1 is performed; if successful, a capacitance value is retrieved from table 1 at step 524 and added to the sum for the segment at 536. If Search 1 is not successful, the tool performs Search 2 at decision block 526; if successful, a capacitance value is retrieved from table 2 at step 528 and added to the sum for the segment at 536. If Search 2 is not successful, the tool performs Search 3 at decision block 530; if successful, it retrieves a capacitance value from Table 3 at step 532; if not, it retrieves a default capacitance at step 534; it then adds the retrieved capacitance to the sum for the segment at 536. At the completion of step 536, the tool proceeds at 522 back to decision block 512. For each net, during the search procedure, the tool also accumulates the total length of metal of adjacent signal wires.

The actual tool processing for the search procedure is described below. The tool determines which table to use and computes the appropriate indices. For the IBM CMOS5 and CMOS6 semiconductor process technologies, this is accomplished as follows:

a. Category 1 (up, down, left, right) uses a 3×3 array to store the 8 capacitances in this category. Table element (0,0) is unused. The first index is computed by counting the number of items one track up and one track down (either 0, 1, or 2). The second index is computed similarly for the left and right directions. If either index is greater than 0, category 1 tables are used and the algorithm skips to step 4.

Note: At a given track along the wire, data tables are not additive. Only one memory reference is done, and that data is the entire capacitance value used for this one track length section of the wire. This is much different than previous pattern matching techniques.

b. Category 2 (diagonally forward and up, forward and down, backward and up, backward and down) uses a one dimensional array of size 16 to store the 6 capacitance values for this category (some data is duplicated). The various directions are encoded as bit masks (8, 4, 2, 1) and or'ed together to determine the index into the table array. If the resulting mask is greater than 0, category 2 data is used and the algorithm skips to step 4.

c. Category 3 (up, down, left, right two tracks away) uses a 3×3 array similar to category 1 to store its 8 capacitance values. Additionally, table entry (0,0) contains the background default (9th) value to be applied if no conductors are located. Thus, if both indices compute to 0 (nothing was found in any of the directions), the background value will be used.

4. At 560 the tool proceeds to decision block 561 and determines if net to net coupling analysis is to be done. If not, the tool proceeds to step 562. If so, it proceeds to 600 and step 604 in FIG. 11. (See following description in section "Net to Net Coupling Capacitance". The tool will return to step 562.)

5. In step 562, for every net in the design, the tool uses the previously calculated capacitance of each wire segment to compute and output:
a. the total capacitance of the net,
b. the RC Delay to each of the sink pins on the net,
c. alternatively, a reduced RC model for the net (ie. PI model with poles and residues) or
d. a full RC SPICE network The tool ends at 563.

Depending on the type of output item chosen, the data volume can be far less than that of the full RC model generated by other three dimensional extraction approaches.

The chip-level extraction tool is able to obtain capacitance and RC values that are accurate to within 10% of hardware. The technique has been used on large (16.3 mm×16.3 mm) 0.18 micron designs using 6 levels of metal. The tool has demonstrated a 50 to 1 improved performance factor over an existing shape-based finite element analysis method.

Net to Net Coupling Capacitance

Capacitance induced by signal switching in neighboring wires is another parasitic mechanism that becomes more significant as feature sizes shrink. This form of capacitance, referred to as coupling capacitance, can only accumulate to significant levels when wires of different nets travel long distances in parallel and are in close proximity to each other. The invention described thus far provides a foundation for analyzing these effects on large-scale ASIC designs as well as other integrated circuits with complex wiring designs. An extension to the invention will extract the capacitance contributed by signal switching and make it available for use by a static timing analysis tool, a noise analysis tool, or a simulator. A static timing analyzer can add the coupling capacitance to the RC model for worst case analysis and subtract it from the model for best case analysis, assuming simultaneous switching all the time. The two pass process described (first doing capacitance extraction ignoring coupling, then doing extraction of the coupling capacitance) avoids the burden of carrying the identity of each adjacency during full chip extraction. The number of nets needed for coupling evaluation in the second pass is reduced by 2 orders of magnitude.

Figure 11:
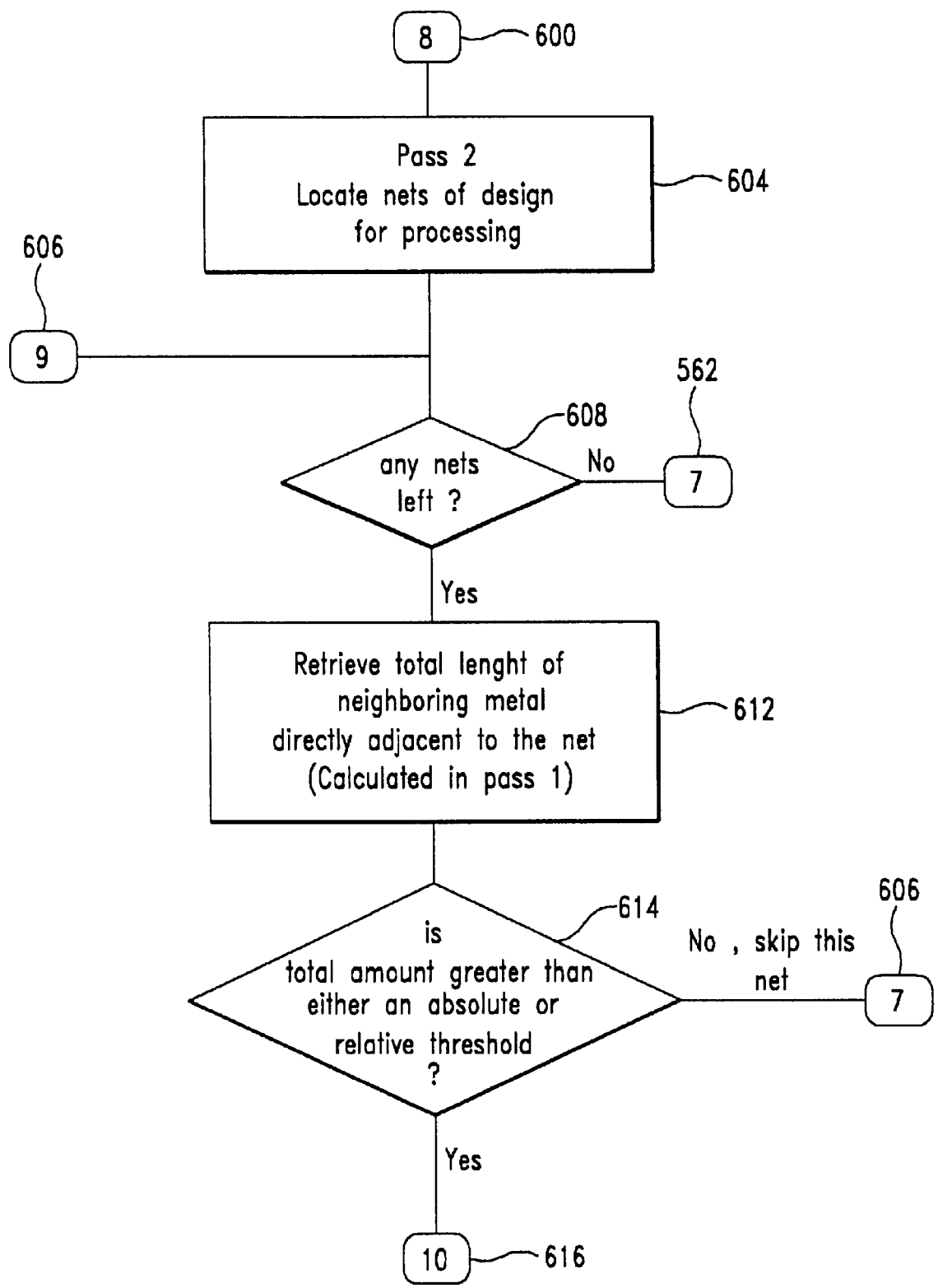
FIGS. 11 and 12 are flow charts describing the chip-level net to net coupling extraction algorithm.
Figure 12:
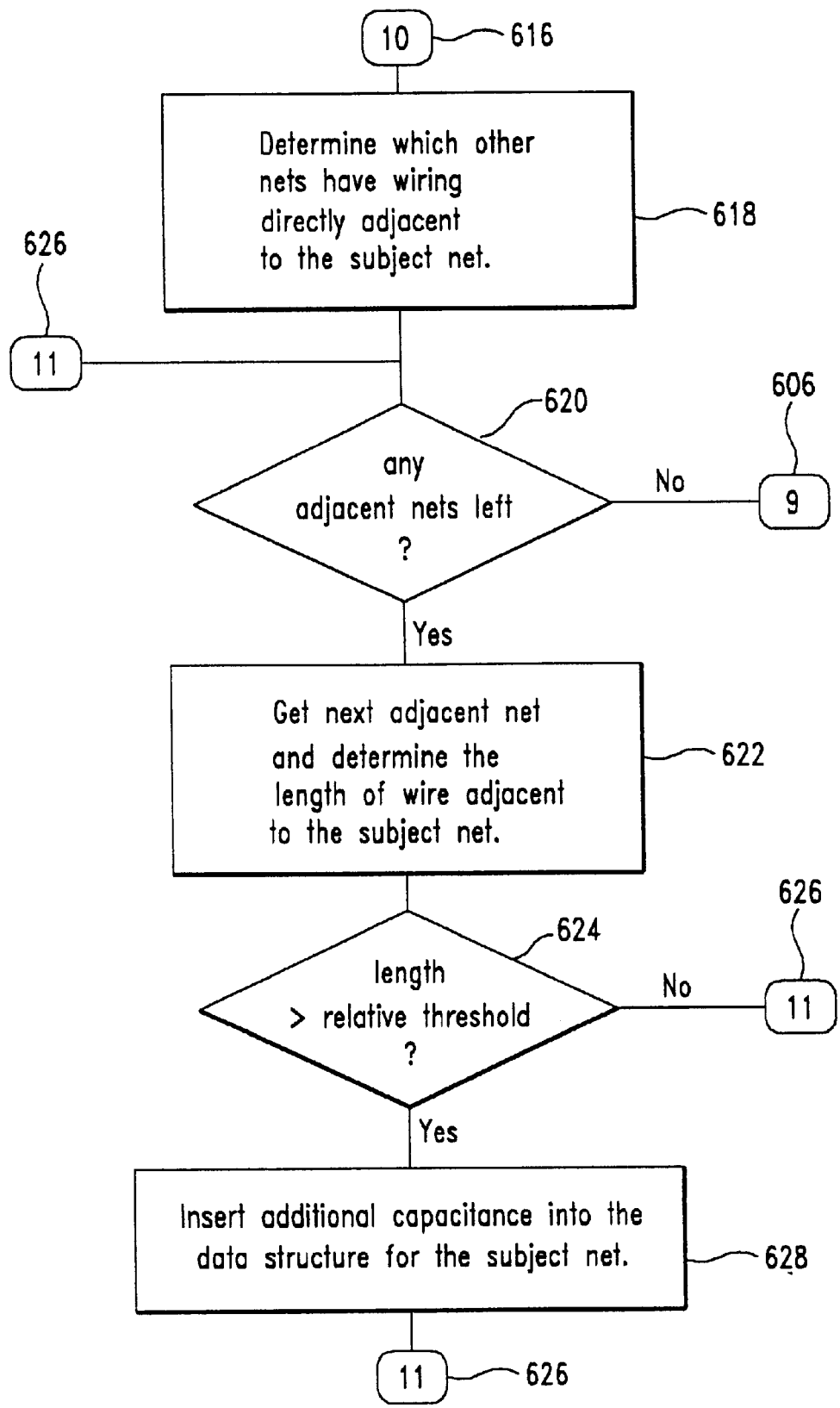

The steps involved in this extension are described below and are illustrated in FIGS. 11 and 12:

The tool starts at 600 by locating the nets for processing in step 604. The tool determines whether any nets remain to be processed at 606 in decision block 608. If not, the tool proceeds to 562. If any nets do remain to be processed, the tool goes to the next net (referred to as the subject net) in step 612 and retrieves the total amount of neighboring metal directly adjacent to a subject net. This was computed in pass 1.

In decision block 614, the tool determines if this total is less than either an absolute or a relative threshold. If so, the coupling capacitance of a subject net is considered insignificant. In this case the subject net can be excluded from the computationally intensive second pass analysis that follows and the tool proceeds to 606 and then to decision block 608.

If the coupling capacitance of the subject net is considered significant in decision block 614, the tool proceeds to 616 and step 618 to analyze the subject net to determine which other nets, if any, have portions of their wring directly adjacent to the subject net.

At 626 in decision block 620, the tool checks whether there are any more adjacent nets left. If not, it returns to 606. If there are, it inspects the next adjacent net in step 622 and determines the length of wire adjacent to the subject net. At decision block 624, the tool determines whether the length exceeds a relative threshold. If not, the tool proceeds to 626. If so, the net is considered to contribute significant coupling capacitance and at step 628 the coupling capacitance is inserted into the the tools data structures for the RC model at the appropriate locations. The tool then returns to 626 and decision block 620 to complete the analysis for the subject net.

The coupling capacitance extraction calculation is done using the same method as described above for capacitance extraction. However, the calculation is done only for those track intersections of the subject net and the adjacent net that are truly adjacent. Similarly, the coupling capacitive value for each pair of adjacent grid points can be determined by the lookup entry approach and any applicable extensions for various wire types and spaces.

When all nets are processed, the tool proceeds to step 562 in FIG. 8.

Resistance Extraction

In future deep-submicron technologies, the wire environment becomes important with respect to resistance extraction due to line width variation as a function of proximity of nearby lines during the etch process. The invention can easily extend to handle this requirement. The technology data for fixed wire types (as in steps 1A and 2A of the Technology Data Generation section above) is collected into a base table for 3 searches. For IBM CMOS7S technology, the topological configurations are listed below.

Search 1 contains 2 topological configurations:
1. (Wire to the Left) and (Wire to the Right)
2. (Wire to the Left) or (Wire to the Right)

If none of the configurations of Search 1 is met, Search 2 is invoked. Search 2 contains 1 topological configuration. (This is a default value which allows the extraction algorithm to do both resistance and capacitance extraction at the same time, assuming the same environment. The default value is a worst-case assumption of the Search 3 environment.)
1. (Wire 2 tracks to the Left) and (Wire 2 tracks to the Right).

If none of the configurations of Search 2 are met, Search 3 is invoked. Search 3 contains 3 topological configurations:
1. (Wire 2 tracks to the Left) and (Wire 2 tracks to the Right)
2. (Wire 2 tracks to the Left) or (Wire 2 tracks to the Right)
3. Neither of the wires 2 tracks away is present (best case environment)

The equation used to compute the total resistance for a wire type of width and space not in the tables specified above for a wire track segment is:

$$R\text{table}=1/(((1/R0)+(1/(R1\times \text{Delta}\_W))+(1/(R2\times \text{Delta}\_D)))\times \text{Sheet-Rho}(W))$$

R0 represents the resistance of a minimum wire width at minimum spacing (value in base tables).

R1 represents the resistance variation due to the width variation and Delta_W is that width.

R2 represents the resistance variation due to the spacing variation and Delta_D is that spacing.

Sheet-Rho(W) is a function of thickness, which is a function of line width.

The following calculations are done to handle this type of wire:

1C) Create a set of table values for all geometries described above containing the values R2 for Search 1 (2 values), Search 2 (1 value) and Search 3 (3 values) for each process condition. These values represent the resistance variation for a wire with space which varies from the base set created above.

2C) Create a set of table values for all geometries described above containing the values R1 for Search 1 (2 values), Search 2 (1 values) and Search 3 (3 values) for each process condition. These values represent the resistance variation for a wire whose width varies from the base tables created above.

3C) Create a set of table values representing Sheet-Rho, which is a function of wire width.

4C) Combine the values of steps 1C, step 2C, step 3C, and the values R0 of the minimum wire type at highest density from base tables into a single table. For purposes of the chip-level extraction discussion, these table values and an on-the-fly calculation can be thought of as a single resistance entry for each unique condition. Note that if there are no fixed wire types, all wires in a design can be handled by this table. Alternatively, these steps could be used to create the base tables described above.

The tables are collected into a complete set of resistance table entries for every wire type, for best case, nominal, and worst case process conditions, for every metallization layer which is used in the extraction process. (Note that "slotting" of wide wires can be taken care of by adjusting the sheet-rho of the wide wires.) The table value calculation is done once per technology, and the data is entered into tables used by the extraction program itself.

The chip-level extraction algorithm can perform resistance extraction at the same time as it is doing capacitance extraction.

Figure 13:
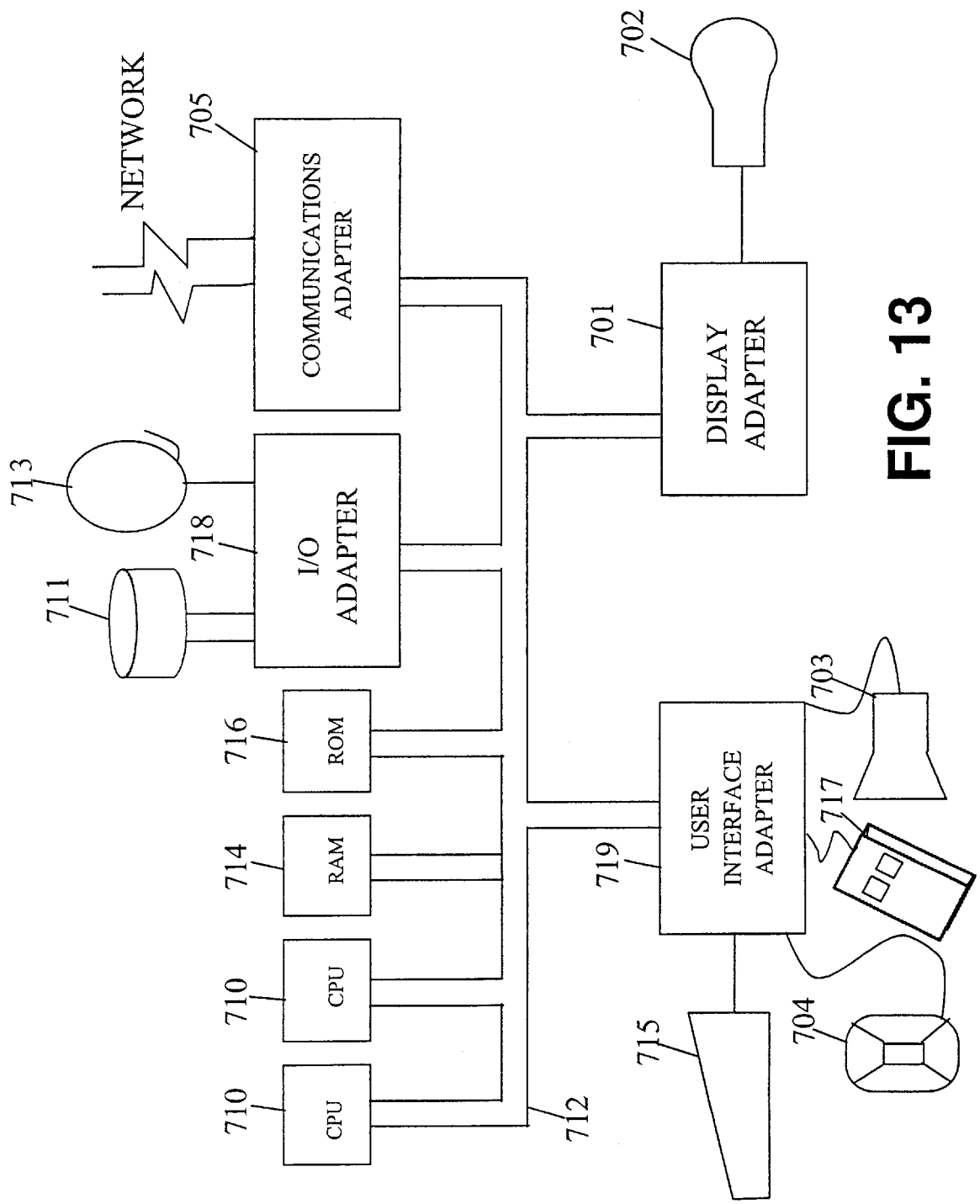
FIG. 13 shows a typical computer system environment for running a computer-based parasitic extraction tool.

A representative hardware environment for practicing the present invention is depicted in FIG. 13, which illustrates a typical hardware configuration of an information handling/computer system in accordance with the subject invention, having at least one processor or central processing unit (CPU) 710. CPUs 710 are interconnected via system bus 712 to random access memory (RAM) 714, read-only memory (ROM) 716, an input/output (I/O) adapter 718 for connecting peripheral devices, such as disk units 711 and tape drives 713, to bus 712, user interface adapter 719 for connecting keyboard 715, mouse 717, speaker 703, microphone 704, and/or other user interface devices such as touch screen device (not shown) to bus 712, communication adapter 705 for connecting the information handling system to a data processing network, and display adapter 701 for connecting bus 712 to display device 702. A program storage device readable by the disk or tape units, is used to load the instructions which operate on a wiring interconnect design which is also loaded onto the computer system.

Although the invention has been described in terms of several exemplary embodiments, it is contemplated that it maybe practiced within the spirit and scope of the appended claims:

What is claimed is:

1. A method of performing capacitance extraction of an integrated circuit comprising the steps of:
    mapping the integrated circuit's wiring design into a three dimensional track based model of the circuit;
    searching at track intersections around a grid unit wire segment for neighboring elements which cause capacitive effects; and
    selecting a capacitance value for the grid unit long wire segment based on the search of neighboring elements.

2. The method of claim 1 also comprising the step of:
    cumulatively adding the capacitance values as each grid unit in a wiring net is analyzed.

3. The method of claim 1 wherein the distance between tracks in the three dimensional model is the minimum width line plus the minimum width space.

4. The method of claim 1 wherein the search is accomplished by using a plurality of search patterns.

5. The method of claim 4 wherein the search patterns are ordered and the search is stopped as soon as neighboring elements which cause capacitive effects are found in a search.

6. The method of claim 5 wherein the search pattern order is established by the distance from the track being analyzed.

7. The method of claim 1 wherein the capacitance value is determined by a table lookup.

8. The method of claim 7 also comprising the step of generating capacitance values for a plurality of wiring types.

9. The method of claim 8 wherein the capacitance values are acquired using conventional 2-D and 3-D field solvers.

10. The method of claim 9 wherein the capacitance values provide for best case, nominal and worst case conditions.

11. The method of claim 10 wherein the method provides for capacitance tables with entries for a plurality of wire types and spacing.

12. A method of performing resistance extraction of an integrated circuit comprising the steps of:
   mapping the integrated circuit wiring design into a three dimensional track based model of the circuit;
   searching at track intersections around a grid unit long wire segment for neighboring elements which cause resistance variations; and
   selecting a resistance value for the grid unit long wire segment based on the search of neighboring elements.

13. The method of claim 12 also comprising the steps of:
   cumulatively adding the resistance values as each grid unit in a wiring net is analyzed.

14. The method of claim 12 wherein the distance between the tracks in the three dimensional model is the minimum width line plus the minimum width space.

15. The method of claim 12 wherein searching is accomplished by using a plurality of search patterns.

16. The method of claim 15 wherein the search patterns are ordered and the search is stopped as soon as neighboring elements are found in a search.

17. The method of claim 12 wherein the selection of the resistance values is accomplished by looking up entries in a table and also comprising the step of generating resistance values for a plurality of wiring type.

18. The method of claim 17 wherein the method provides for table entries for a plurality of wire types.

19. A program storage device readable by machine, tangibly embodying a program of instructions executable by the machine to perform method steps for extraction of parasitic effects on wire segments in an integrated circuit wiring design, said method steps Comprising:
   mapping the integrated circuit wiring design into a three dimensional track based model of the circuit;
   searching at track intersections around a grid unit long wire segment for neighboring elements which cause parasitic effects; and
   selecting the electrical characteristic for the grid unit long wire segment based on the search of neighboring tracks.

20. The program storage device of claim 19 wherein the search is accomplished by using a plurality of search patterns.

21. The program storage device of claim 20 wherein the search patterns are ordered and the search is stopped as soon as neighboring elements are found in a search.

22. The program storage device of claim 19 wherein the electrical characteristics are entered in the form of a table.

23. The program storage device of claim 19 wherein the distance between the tracks in the three dimensional model is the minimum width line plus the minimum width space.

24. The program storage device of claim 23 wherein the electrical characteristics for wire types and spaces are generated dynamically.

25. A computerized design system for extracting the parasitic effects on wire segments in an integrated circuit wiring design which comprise:
   means for mapping the integrated circuit wiring design into a three dimensional track based model of the circuit;
   means for searching a track intersections around a grid unit long wire segment for neighboring elements which cause parasitic effects; and
   means for selecting the electrical characteristics for the grid unit long wire segment based on the search for neighboring elements.

26. The computerized design system of claim 25 which also comprises:
   means for cumulatively adding the electrical characteristics;
   means for storing the electrical characteristics for RC processing; and
   wherein the means for selecting electrical characteristics includes a means for storing the characteristics in a table and a means for generating electrical characteristics for wire types and spacing not provided for by the tables.

27. A method for analyzing capacitance coupling in wiring nets in an integrated circuit comprising the steps of:
   mapping the integrated circuit wiring design into a three dimensional track based model of the circuit;
   determining which nets have wiring directly adjacent to the wiring net being processed;
   searching the adjacent nets and determining by stepping track intersection by track intersection the length of wire adjacent the wiring net being processed; and
   selecting a coupling capacitance value based on this search;
   inserting the additional capacitance into a model for the wiring net being processed.

28. A method of claim 27 also comprising the step of:
   selecting the wiring nets for processing by calculating the amount of metal in the neighboring wiring adjacent to that net and determining if it exceeds a threshold amount.

* * * * *